Aug. 12, 1958
J. H. MOORE
2,847,269
CIRCULAR-CHART EXHIBITING DEVICE
Filed Aug. 30, 1955
2 Sheets-Sheet 1
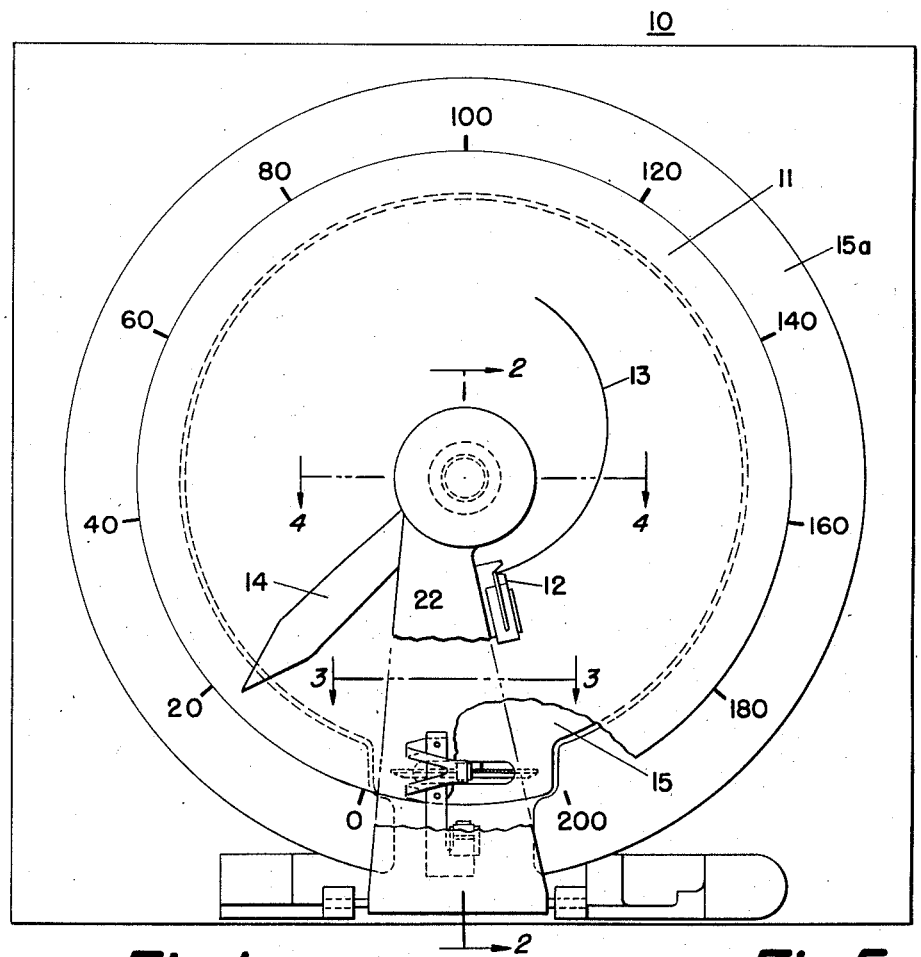
Fig. 1
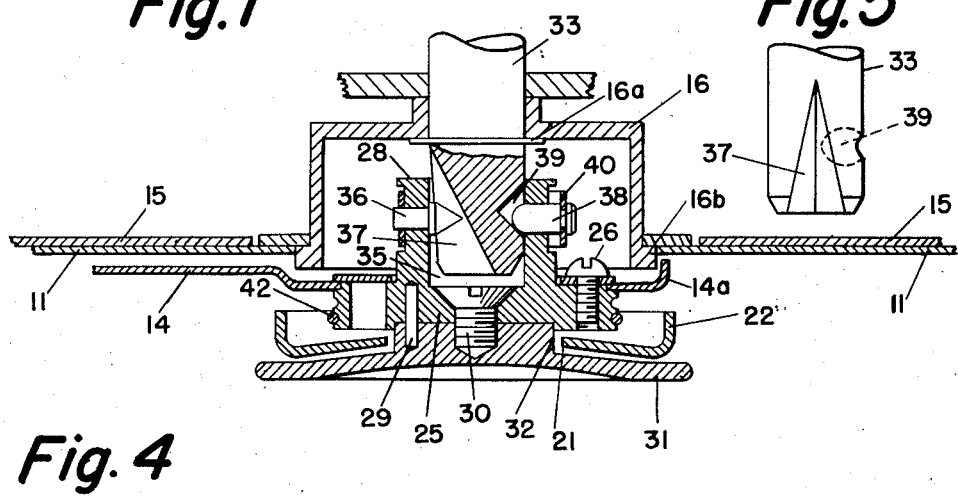
Fig. 4
Fig. 5

Aug. 12, 1958  J. H. MOORE  2,847,269
CIRCULAR-CHART EXHIBITING DEVICE
Filed Aug. 30, 1955  2 Sheets-Sheet 2
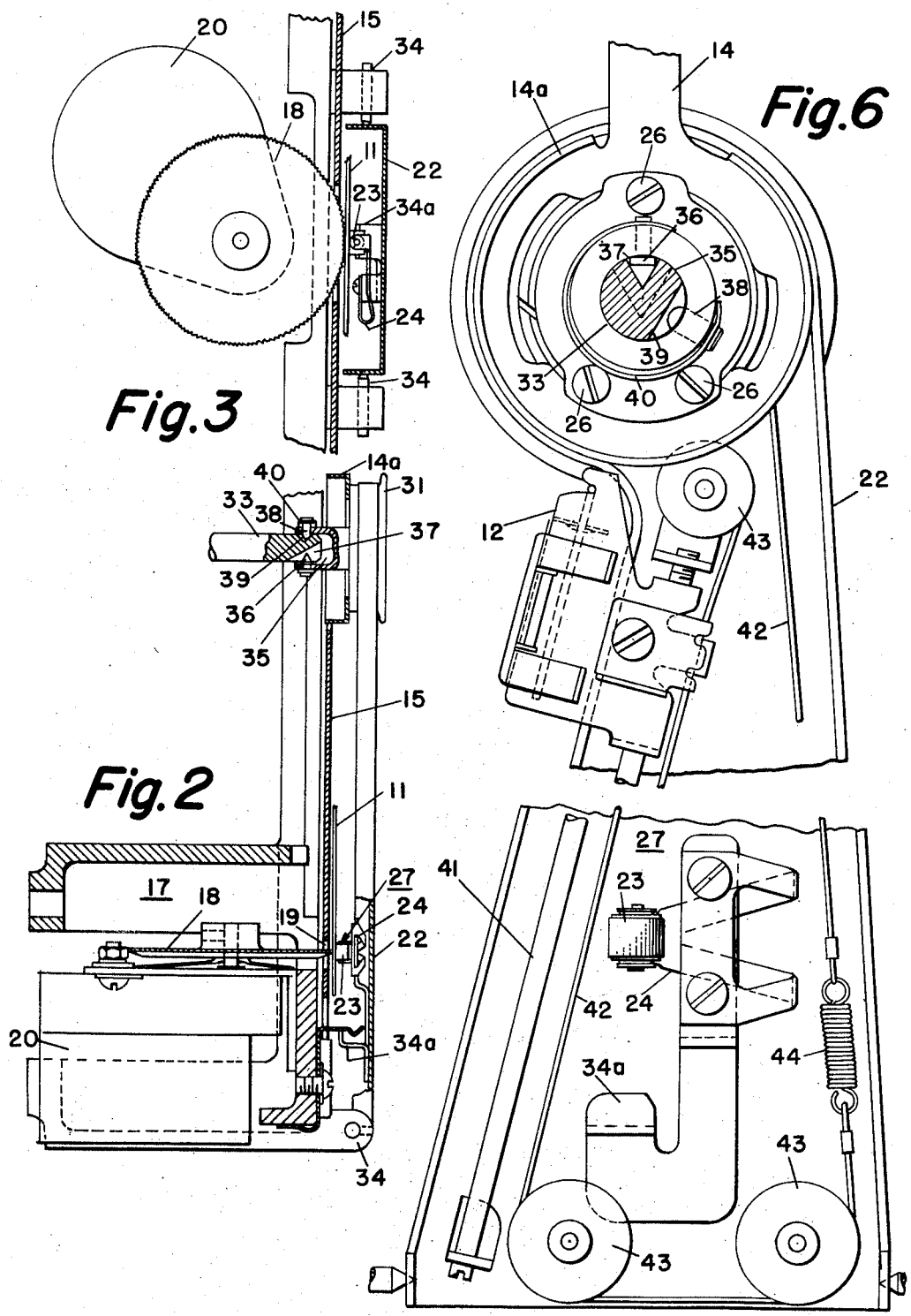

United States Patent Office 2,847,269
Patented Aug. 12, 1958

2,847,269

CIRCULAR-CHART EXHIBITING DEVICE

John H. Moore, Havertown, Pa., assignor to Leeds and Northrop Company, Philadelphia, Pa., a corporation of Pennsylvania Application August 30, 1955, Serial No. 531,335

4 Claims. (Cl. 346—17)

The present invention relates to improvements in exhibiting devices of the type employing circular charts and, more particularly, to an improved arrangement for transmitting motion to a chart and to an indicator and has for an object the provision of a unitary assembly movable to connect and disconnect the chart drive and indicator drive.

It is another object to provide a high-torque, zero-lost-motion coupling or zero-backlash coupling for the indicator drive while retaining quick connect and quick disconnect features.

It is yet another object of the present invention to provide a common mounting structure for a chart-drive coupling means and an indicator-drive coupling means which when moved to effect a disconnection of the chart and indicator from their respective drives, exposes the chart for examination or replacement.

In accordance with the present invention, there is provided for use in an exhibiting apparatus of the type employing a circular chart, an indicator movable with respect to the chart, a friction-driving means for rotation of the chart and an indicator-supporting structure pivotally mounted for movement in one direction to a position parallel with the chart and movable in another direction to a position substantially perpendicular to the chart for completely exposing the chart for providing a ready replacement of the chart. A resilient roller structure is mounted on the indicator-supporting structure for movement with the structure to a position for engagement with one side of the chart to effect a frictional driving relation between the chart and the friction-driving means. A coupling means is mounted on the indicator-supporting structure to provide a driving connection between the indicator and the driving means. The drive for the chart and the drive for the indicator are disconnected upon movement of the indicator-supporting structure from a position adjacent the chart toward a position away from the chart.

Further in accordance with the present invention, there is provided in a circular chart recorder a chart back-up plate, a driving shaft disposed centrally of the plate, and a chart-supporting hub mounted concentrically with respect to the drive shaft for supporting a chart for rotation. The drive shaft is provided with a groove opening at one end thereof and a recess axially displaced from the groove and longitudinally displaced from the end of the shaft. An indicator is mounted on an indicator-supporting structure pivotally mounted at a point spaced from the periphery of the chart back-up plate structure for movement toward and away from the plate structure. A coupling means for connecting the indicator to the drive shaft is rotatably mounted at a free end of the indicator-supporting structure and includes a hollow cylindrical structure, having affixed thereto a pin extending radially into the hollow area thereof for engagement with the groove of the drive shaft for effecting a high-torque, zero-lost-motion transmission from the shaft to the indicator. A second pin is resiliently mounted on the cylinder and extends radially into the hollow portion thereof to be received by the recess in the drive shaft for locking the coupling means to the drive shaft. A spring-biased roller is mounted on the indicator-supporting structure intermediate the ends thereof for engagement with a side of the chart for effecting a driving connection between the chart and the friction-driving means when the indicator-supporting structure is moved to a position to effect coupling of the indicator with the drive shaft.

For other objects and advantages of the present invention, reference may be had to the following detailed description taken in conjunction with the accompanying drawings, in which:

Fig. 1 is a front elevational view of a recorder, embodying the present invention, broken away to illustrate features of construction;

Fig. 2 is an enlarged sectional view taken along line 2—2 of Fig. 1 and illustrating a preferred embodiment of the present invention;

Fig. 3 is a sectional view taken along line 3—3 of Fig. 1 and illustrating the chart-drive mechanism;

Fig. 4 is an enlarged sectional view taken along the line 4—4 of Fig. 1 and illustrating features of construction, including an indicator-drive coupling arrangement;

Fig. 5 illustrates a portion of the indicator drive shaft provided with a torque transmitting groove and a recess providing part of a means for locking the indicator to the drive shaft; and Fig. 6 is an enlarged view of the back portion of the indicator-supporting structure.

Referring now to the drawings and more particularly to Fig. 1, there is illustrated an exhibiting instrument 10 of the round chart recorder type in which a chart 11 is supported for rotation in accordance with the changes in one variable, for example, time. A marking means such as pen mechanism 12 scribes upon the face of the chart 11 a record of a second variable, for example, temperature, as represented by the line 13. Instantaneous indications of the value of the second variable are indicated by an index or pointer 14 coupled to the pen mechanism 12 which form an indicator-marking means positioned by any suitable measuring system, such as that disclosed in Williams Patent 2,113,164.

The chart 11 rests against a chart back-up plate 15 and is driven about a supporting hub 16 (Fig. 4) by way of a friction-driving mechanism 17 (Fig. 2) in accordance with the first variable, time. The friction-driving mechanism is shown to include a friction wheel 18 positioned adjacent the periphery of the chart back-up plate 15 and extending through an aperture 19 therein to engage one side of the chart 11. When time is selected as the first variable, the friction wheel 18 may be driven by a suitable source of constant speed, such as, for example, a synchronous motor 20.

The chart 11 is coupled with the friction wheel 18, which may be provided with a serrated periphery, by way of a biasing means 27 mounted, in accordance with the present invention, on an indicator-supporting structure or arm 22. The biasing means 27 may be comprised of a roller bearing 23 rotatably mounted at one end of a looped leaf-spring member 24, having its opposite end affixed in any suitable fashion to the supporting structure or arm 22. With the arm 22 in its illustrated position (Fig. 2) a predetermined force is applied against an adjacent surface of the chart by the spring-biased roller bearing 23 to move the opposite surface of the chart into friction-driving engagement with the serrated edge of the friction-driving wheel 18 and thus effect a driving couple between the chart and the wheel.

The indicator or pointer 14 is mounted (Fig. 4) on the arm 22 by way of a hub assembly 25. The pointer 14 is affixed to the hub assembly 25 as by machine screws 26, and the hub assembly is mounted for rotation in aperture 21 at one end of the arm 22. The hub assembly 25 comprises a coupling means 28, rigidly affixed as by pin 29 and machine screw 30 to an end cap 31 having a shoulder 32 providing a bearing surface for rotatably supporting the hub assembly in the aperture 21. The coupling means 28 connects the indicator-marking means comprising the pointer 14 and the pen mechanism 12 to a drive shaft 33, driven in accordance with changes in the second variable as measured by a suitable measuring instrument or system, such as disclosed in the aforesaid Williams patent.

The shaft 33 is disposed centrally of the chart-supporting hub 16 and is rotatable relative thereto, the hub 16 being held stationary by an arm not shown. The hub 16 is fixed longitudinally of the shaft 33 by way of a retaining ring 16a seated in a suitable circumferential groove formed in the shaft. The hub assembly 25 also includes means for retaining the chart 11 on the chart-supporting hub 16. Such means is provided by a flange 14a, which may be formed integral with the indicator 14, extending over a chart-supporting shoulder 16b of the hub 16. When coupling is effected between the shaft 33 and the hub 25, the chart is simultaneously loosely retained on supporting hub 16 so that it will rotate thereabout.

In accordance with the present invention, both the coupling means 28 and the chart-biasing means 27 are mounted on the arm 22 for movement toward and away from the surface of the chart 11 as by rotation of the arm 22 about a pivot structure 34 mounted either at or spaced outwardly from the periphery of the chart back-up plate 15. The unitary structure formed by the assembly of the aforesaid elements makes possible the simultaneous connection and disconnection of the pointer 14, pen mechanism 12 and the friction-driving mechanism 17 by merely moving in a single motion the arm 22 toward and away from the chart back-up plate 15. With the arm in its illustrated position (Fig. 2) substantially parallel with the chart back-up plate 15, the biased roller bearing 23 is in position to engage the chart and move it into frictional drive contact with the serrated wheel 18, and the pointer and pen mechanism are connected to the drive shaft 33. In disconnecting the coupling means 28 and biasing means 27, the arm 22 may be moved about the pivot structure 34 and held in a position spaced from the chart 11 by a resilient catch 34a. With the arm 22 in the spaced position, the chart 11 may be readily replaced. When the recorder is to be worked upon, the arm 22 may be swung free of the catch 34a to expose the entire front surface of the recorder.

The coupling means 28 provides a snap fit with the drive shaft 33 and also effects a zero-lost-motion connection therewith for precisely transmitting the rotary motion of the shaft 33 to the pointer or indicator 14 and to the pen mechanism 12.

The coupling means 28 is provided with a counterbore 35 for receiving an end of the shaft 33. A pin 36 extends through a wall of the coupling means 28 and into the counterbore or recess 35 for engagement with wall structure of a groove 37 formed at the end of the shaft 33. The groove 37, in the preferred form, is of triangular cross-section opening at the end of the shaft and being of ever decreasing dimension in a direction away from the shaft end. The groove 37 and pin 36 provide means for accurately relocating the pointer 14 and the pen mechanism 12 with regard to the rotational position of the shaft 33 so that after a disconnection of the pointer 14 with the shaft, as for reason of changing the chart or examining a portion of the chart disposed behind the supporting arm 22, the pointer 14 may again be correctly positioned accurately to indicate the instantaneous value of the second variable.

In addition, the pin 36 effects with the wall structure of the groove 37 a high-torque, zero-lost-motion driving connection. Such connection is effected by reason of the end of the pin 36 being tapered, here illustrated as being of cone-like configuration, so that as it is moved into the groove 37, it is seated in the matching angularly disposed walls of the groove 37. Such contact is made when the pin is moved a sufficient distance along the shaft. After seating contact is made, movement of the pin 36 relative to the groove 37 in a direction back toward the end of the shaft is prevented by a spring-biased latching pin 38, thus maintaining the high-torque, zero-lost-motion connection.

The spring-biased latching pin 38 extends through an aperture in the coupling means 28 and into the hollow portion 35 thereof for engagement with ball structure of a recess 39 formed adjacent the groove 37. The recess 39, in a preferred form, is a triangular notch disposed transversely of the shaft 33 and circumferentially spaced from the groove 37. The pin 38 is biased to move into engagement with the walls of the recess 39 by a leaf spring 40, having one end thereof affixed to the coupling assembly, preferably at the coupling pin 36 to simplify construction. The pin 38, being pressed against the inclined surface of recess 39, functions to maintain pin 36 in seating engagement with the walls of groove 37.

The removal or disconnection of the coupling means from the shaft 33 is readily effected by merely pulling on the cap 31 in a direction away from the shaft 33, thus causing the pin 38 to ride up the inclined wall of the recess 39 against the force of the spring 40 until the pin is completely removed from the recess 39.

The transmission of motion from the coupling means 28 to the pen mechanism 12 may be by way of any well-known arrangement to effect a written record upon the chart of the magnitude of the measured variable at any period of time. In Fig. 6 there is illustrated a preferred arrangement for driving the pen mechanism 12, which arrangement includes cylindrical rod 41, disposed along the arm 22 and upon which the carriage of the pen mechanism is slidably mounted. The carriage of the pen mechanism 12 is connected by way of a cord or cable 42 disposed about pulleys 43 to the hub assembly 25. Tension on the cord or cable is maintained by a coil spring 44. Rotation of the hub assembly 25 in accordance with the measured second variable is translated by the pulleys 43 and the cord or cable to linear motion of the pen mechanism 12 along the rod 41.

The coupling arrangements embodying the present invention provide an accurate positioning of the marking means or pen mechanism 12 by reason of the pin 36 and the walls of the zero-backlash connection between the pin 36 and the walls of the shaft groove 37. Because of the high-torque transmitting characteristics of the coupling, the mass of the elements comprising the pen mechanism 12 and the cord drive need be limited only to the capability of the drive for shaft 33 to deliver sufficient torque to move the mechanism.

Thus a recorder or exhibiting instrument embodying the present invention will accurately indicate and record the characteristics of measured variables while providing ease of replacement of charts by reason of the novel assembly of biasing means 27 and coupling means 28 being mounted on the movable supporting structure or arm 22.

What is claimed is:

1. A circular chart recorder comprising a chart back-up plate, a drive shaft disposed centrally of said plate, a chart-supporting hub mounted concentrically with respect to said drive shaft for supporting the chart for rotation, said drive shaft having a groove opening at one end thereof and of decreasing dimension in a direction away from said end and a recess having a surface inclined toward said end of said shaft, said recess being displaced from said groove and longitudinally displaced from said end of said shaft, an indicator, indicator-supporting structure pivotally mounted at a point disposed from the periphery of said chart back-up plate structure, coupling means for connecting said indicator to said drive shaft and rotatably mounted at the free end of said indicator-supporting structure, said coupling means comprising a member with a counterbore having solidly affixed thereto a pin extending radially into the counterbore for seating engagement with said groove of said drive shaft for effecting a high-torque, zero-backlash connection between said drive shaft and said indicator, a second pin resiliently mounted on said member and extending radially into said counterbore to be received by said inclined surface of said recess in said drive shaft for retaining said coupling means in seated engagement with said drive shaft, friction driving means engageable with one side of said chart, and a spring-biased roller mounted on said indicator-supporting structure intermediate the ends thereof for engagement with an opposite side of said chart for effecting a driving connection between the chart and said friction driving means when said indicator-supporting structure is moved to effect coupling of said indicator with said drive shaft.

2. In a circular chart recorder having marking means, the radial position of which is a function of a first variable and a chart, the rotary position of which is a function of a second variable, chart-supporting and driving means, and marking-means positioning means comprising a shaft, the rotary position of which is a function of said first variable, a hub about which the chart may rotate, chart back-up structure supported concentrically with respect to said shaft, a drive wheel rotating as a function of said second variable and having a portion thereof projecting through said back-up structure in chart-engageable relation, marking-means supporting structure, means mounted on said supporting structure for coupling said marking means to said shaft, said supporting structure being movable toward the chart to effect coupling between said marking means and said shaft and movable away from the chart to effect a decoupling between said marking means and said shaft, and biasing means mounted on said supporting structure and movable with said supporting structure toward the chart to move the chart into driving engagement with said drive wheel, the drive of the chart and the drive for said marking means being concurrently connected solely by movement of said supporting structure toward the chart and said drives being concurrently disconnected solely upon movement of said supporting structure away from the chart to completely expose the chart and permit ready replacement thereof.

3. An exhibiting device comprising structure including means supporting a chart for rotation, friction driving means for engaging one side of the chart, an arm pivotally mounted to said structure, an indicating device mounted on said arm, a driving shaft for said indicating device, said shaft having a groove opening at one end thereof and of decreasing dimension in a direction away from said end, a notch in said shaft, means on said arm for coupling said indicating device to said shaft upon pivotal movement of said arm to a position parallel with said chart-supporting means, said coupling means comprising a sleeve having a spring-biased pin for reception by said notch for locking said sleeve and said shaft in position along the axis of said shaft, a second pin on said sleeve to be received by said groove and biased into seating engagement with said groove by said locking means for transmission of torque from said shaft to said sleeve, and a spring-biased roller mounted on said arm for engaging the chart to move the chart into driving contact with said friction driving means when said arm is pivoted to couple said indicating device to said driving shaft.

4. In an exhibiting apparatus of the type employing a circular chart, friction-driving means engageable with a surface of the chart for rotating the chart, indicator-marking means and driving means for moving the indicator-marking means relative to the chart, the improvement which comprises supporting structure for said indicator-marking means, said supporting structure being pivotally mounted to said apparatus at a point spaced from the outer periphery of the chart for movement from an operating position substantially parallel with the chart to a non-operating position substantially perpendicular to the chart for completely exposing the chart free of any overlying structure and permitting ready replacement of the chart, resilient roller means mounted on said supporting structure for movement with said structure to said parallel position for engagement with an opposite surface of the chart to effect frictional driving relation between the chart and said friction-driving means, and coupling means mounted on said supporting structure to provide a driving connection between the indicator-marking means and the driving means, the drive for the chart and the drive for the indicator-marking means being concurrently connected solely by movement of said supporting structure to its said parallel position and said drives being concurrently disconnected solely upon movement of said supporting structure to a position away from said parallel position.

References Cited in the file of this patent

UNITED STATES PATENTS

| | | |
|---|---|---|
| 1,840,830 | Bristol | Jan. 12, 1932 |
| 2,074,116 | Stein | Mar. 16, 1937 |
| 2,124,832 | Schofield | July 26, 1938 |
| 2,746,832 | Blakeslee | May 22, 1956 |